(12) United States Patent
Stellnert et al.

(10) Patent No.: US 9,399,990 B2
(45) Date of Patent: Jul. 26, 2016

(54) CONTROLLABLE VACUUM SOURCE

(75) Inventors: Mats Stellnert, Farsta (SE); Martin Sjölund, Grödinge (SE)

(73) Assignee: DELAVAL HOLDING AB, Tubma (SE)

( * ) Notice: Subject to any disclaimer, the term of this patent is extended or adjusted under 35 U.S.C. 154(b) by 204 days.

(21) Appl. No.: 12/923,100

(22) Filed: Sep. 2, 2010

(65) Prior Publication Data

US 2011/0000562 A1   Jan. 6, 2011

Related U.S. Application Data

(62) Division of application No. 11/631,649, filed as application No. PCT/SE2005/000949 on Jun. 20, 2005, now Pat. No. 7,886,692.

(60) Provisional application No. 60/587,030, filed on Jul. 13, 2004.

(51) Int. Cl.
| | |
|---|---|
| F04B 41/06 | (2006.01) |
| F04B 49/02 | (2006.01) |
| A01J 5/007 | (2006.01) |
| A01J 5/04 | (2006.01) |
| F04B 37/14 | (2006.01) |
| G05D 16/20 | (2006.01) |

(52) U.S. Cl.
CPC .............. *F04B 49/022* (2013.01); *A01J 5/007* (2013.01); *A01J 5/048* (2013.01); *F04B 37/14* (2013.01); *F04B 41/06* (2013.01); *G05D 16/2073* (2013.01); *F04B 2205/01* (2013.01); *Y10T 137/86083* (2015.04)

(58) Field of Classification Search
USPC ............. 417/2, 20, 22, 53, 26, 309, 7, 8, 426; 137/565.23; 119/14.2, 14.43, 14.08
See application file for complete search history.

(56) References Cited

U.S. PATENT DOCUMENTS

| | | | | |
|---|---|---|---|---|
| 3,294,023 | A * | 12/1966 | Martin-Vegue, Jr. | G05D 7/0682 307/41 |
| 3,744,932 | A * | 7/1973 | Prevett .................... | G05D 9/12 417/7 |
| 4,011,838 | A * | 3/1977 | Nordegren et al. ........ | 119/14.08 |
| 4,259,038 | A * | 3/1981 | Jorgensen .......... | G05D 16/2073 417/5 |
| 4,616,215 | A | 10/1986 | Maddalena | |

(Continued)

FOREIGN PATENT DOCUMENTS

| | | |
|---|---|---|
| BY | 4708 C1 | 9/2002 |
| DE | 19900096 | 7/2000 |

(Continued)

OTHER PUBLICATIONS

International Seach Report (PCT/ISA/210).

(Continued)

*Primary Examiner* — Charles Freay
(74) *Attorney, Agent, or Firm* — Young & Thompson

(57) ABSTRACT

The present invention relates to a vacuum source for providing vacuum to at least a first vacuum drain through conduits, comprising at least a first and a second vacuum pump. The vacuum source comprises a control system adapted to detect the consumed airflow, and to control the operation of each of the first and second vacuum pump based on the detected airflow.

9 Claims, 4 Drawing Sheets

(56) References Cited

U.S. PATENT DOCUMENTS

| | | | |
|---|---|---|---|
| 4,951,475 A * | 8/1990 | Alsenz | F25B 49/022 417/7 |
| 5,039,280 A * | 8/1991 | Saulgeot et al. | 417/205 |
| 5,067,326 A * | 11/1991 | Alsenz | F25B 49/022 184/6.1 |
| 5,110,264 A * | 5/1992 | Murry | 417/45 |
| 5,165,864 A * | 11/1992 | Burger et al. | 417/244 |
| 5,259,735 A * | 11/1993 | Takahashi et al. | 417/203 |
| 5,542,828 A * | 8/1996 | Grenci et al. | 418/1 |
| 5,704,311 A | 1/1998 | Van Den Berg | |
| 5,746,581 A * | 5/1998 | Okumura et al. | 417/2 |
| 5,797,729 A | 8/1998 | Rafuse, Jr. et al. | |
| 5,845,509 A | 12/1998 | Shaw et al. | |
| 5,845,599 A | 12/1998 | Bova et al. | |
| 5,960,736 A | 10/1999 | Ludington et al. | |
| 5,971,711 A * | 10/1999 | Noji et al. | 417/2 |
| 6,030,181 A * | 2/2000 | Conrad | 417/53 |
| 6,164,242 A * | 12/2000 | Olofsson | 119/14.02 |
| 6,185,946 B1 | 2/2001 | Hartman | |
| 6,200,107 B1 * | 3/2001 | Brewster | 417/251 |
| 6,370,888 B1 | 4/2002 | Grabon | |
| 6,419,455 B1 * | 7/2002 | Rousseau et al. | 417/36 |
| 6,921,379 B2 | 7/2005 | Greter et al. | |
| 7,607,404 B2 | 10/2009 | Stellnert et al. | |
| 7,658,164 B2 | 2/2010 | Schuster | |
| 7,909,055 B2 | 3/2011 | Mostert | |
| 8,371,821 B1 * | 2/2013 | Mehr | F04B 47/06 417/12 |
| 2002/0034447 A1 * | 3/2002 | Brazil et al. | 417/279 |
| 2003/0019431 A1 | 1/2003 | Van Den Berg et al. | |
| 2003/0061993 A1 | 4/2003 | Vijverberg et al. | |
| 2003/0123990 A1 * | 7/2003 | Yamamoto et al. | 417/44.11 |
| 2003/0180153 A1 * | 9/2003 | Yamamoto et al. | 417/53 |
| 2003/0226506 A1 | 12/2003 | van den Berg | |
| 2004/0182325 A1 | 9/2004 | Sjolund et al. | |
| 2005/0056224 A1 | 3/2005 | Van Den Berg et al. | |
| 2005/0115256 A1 | 6/2005 | Okano | |
| 2005/0120965 A1 | 6/2005 | Van Den Berg et al. | |
| 2005/0188708 A1 | 9/2005 | Wills et al. | |
| 2005/0223724 A1 | 10/2005 | Crane et al. | |
| 2006/0156990 A1 | 7/2006 | Bosma et al. | |
| 2008/0041315 A1 | 2/2008 | Stellnert et al. | |
| 2009/0084318 A1 | 4/2009 | Bosma | |
| 2010/0154715 A1 | 6/2010 | Persson et al. | |
| 2011/0132264 A1 | 6/2011 | Akerman | |

FOREIGN PATENT DOCUMENTS

| | | |
|---|---|---|
| EP | 1344941 A1 | 9/2003 |
| EP | 1369033 | 12/2003 |
| EP | 1906024 A2 | 4/2008 |
| JP | 2004524016 A | 8/2004 |
| SU | 1606054 A1 | 3/1990 |
| SU | 1558349 A1 | 4/1990 |
| SU | 1607749 A1 | 11/1990 |
| WO | WO 02/03780 | 1/2002 |
| WO | WO 0203780 A1 * | 1/2002 |
| WO | WO 03/045133 | 6/2003 |
| WO | 2006006906 A1 | 1/2006 |
| WO | 2006051260 A1 | 5/2006 |

OTHER PUBLICATIONS

Translation of Japanese Office Action, dated Mar. 13, 2012, from corresponding Japanese application No. 2010-502056.

Decision on Grant, dated Apr. 5, 2012, from corresponding Russian application No. 2009140398.

US 5,878,691, 03/1999, Ludington et al. (withdrawn)

* cited by examiner

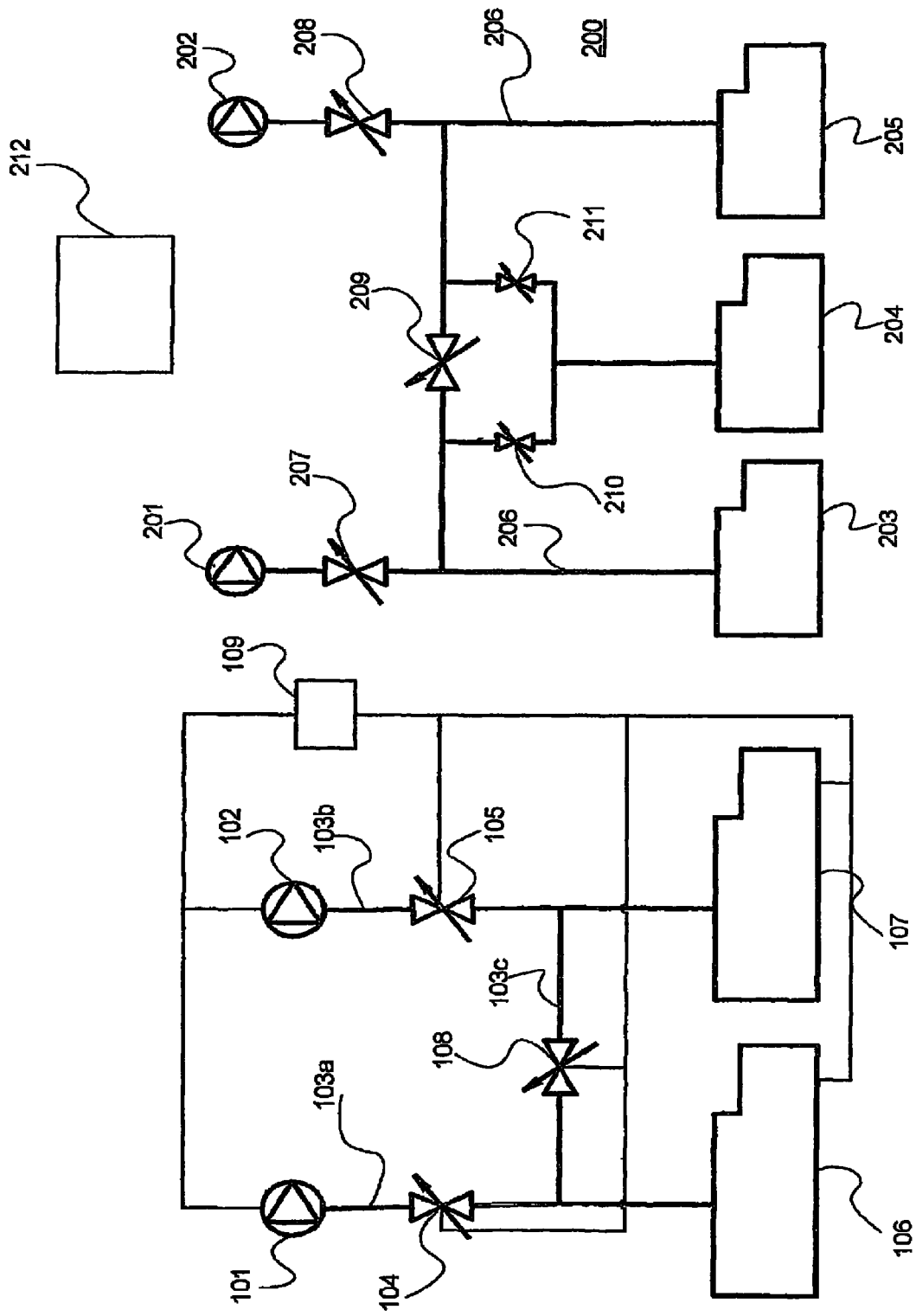

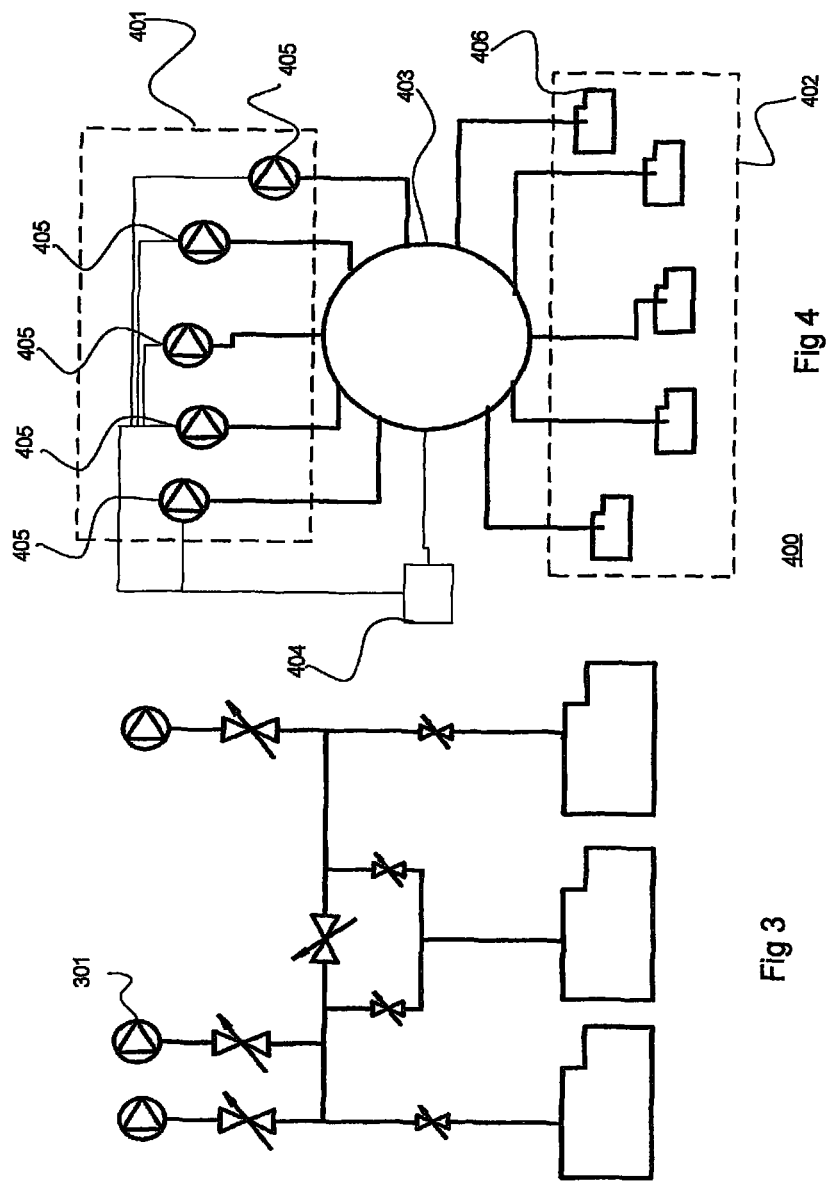

CONTROLLABLE VACUUM SOURCE

PRIORITY INFORMATION

This application is a divisional of and claims priority under 35 U.S.C. §120 to application Ser. No. 11/631,649 "CONTROLLABLE VACUUM SOURCE" filed Jan. 5, 2007 now U.S. Pat. No. 7,886,692, which is a national stage entry of and claims priority under 35 U.S.C. §371 to PCT International Application No. PCT/SE2005/000949 filed Jun. 20, 2005, which claims priority to U.S. provisional application 60/587,030 filed on Jul. 13, 2004. The contents of all of the above-listed applications are incorporated herein by reference in their entirety.

BACKGROUND OF THE INVENTION

In modern automatic milking farms vacuum pumps supply vacuum to the milking equipment for performing necessary tasks, such as milking and washing of the equipment.

Since milking animals need to be milked with a regular interval it is necessary that the equipment is functional and longer malfunctions are not tolerated due to animal health care and for economic reasons. Therefore it is commonplace to have two separate vacuum pumps, each being capable of supplying the vacuum needed for the operation of the milking equipment, one for ordinary use and one as a back-up vacuum pump. The back-up pump should be kept operational and it is therefore important to regularly start the back-up vacuum pump for lubrication purposes, to prevent corrosion and as well to generally make sure it is working. It is of course expensive to have a back-up pump standing in case of failure of the main pump, as well as cumbersome to remember now and then to start the back-up pump.

For some jurisdictions both the operating vacuum pump and the back-up vacuum pump need to be dimensioned according to regulations requiring that every milking point in a milking parlour should have a vacuum reserve. In large milking parlours this will add up to significant vacuum reserves. When the airflow requirements are not significant the vacuum pump may be operated at a lower rotation speed. If the vacuum pump is over-dimensioned, due to regulations, this situation will occur more often than otherwise having negative effects on the vacuum pump system.

Due to the lower rotation speed pumps may be over heated due to lower airflow there through, lubrication of the pump may be insufficient, the efficiency of the motor driving the pump is low since motors are dimensioned to be optimally efficient for a particular rotation speed, the efficiency of the pump may be reduced due to for instance increased air leakage. Moreover, the vacuum pump is generally over-dimensioned resulting in increased capital cost, not to mention difficulties in handling of larger vacuum pumps.

One way of reducing these problems is to introduce so called bleeders, which will allow air into the vacuum system, thereby forcing the vacuum pump into a higher rotation speed. This, is however obviously a waste of resources.

A milking machine in a traditional milking parlour may have 6 to 50 milking points using one vacuum pump. Traditionally, a robotic milking machine serving one animal at a time uses one vacuum pump.

In larger automatic robotic milking farms two or more automatic milking robots may be serving a herd of milking animals. These automatic milking machines will then have a common, total vacuum requirement which the vacuum pumps need to be dimensioned for. Furthermore, such automatic milking machines operate in different operating modes, such as milking, equipment washing, teat cleaning and stand-by to mention a few. Each of these modes have individual vacuum requirements, where for instance equipment washing may have a high airflow at some vacuum level, and milking will have a small airflow, but requires a steady vacuum level. Thus, the vacuum pumps need to be dimension to handle a situation where all automatic milking machines are in the worst operating mode for vacuum supplying purposes. Equipment washing may in turn include a number of different washing steps, such as washing of teat cups, washing of teat cleaning cups, washing of conduits, etc. Further more, equipment washing can on one hand be a short rinsing of teat cups and conduits, which may be conducted between every animal in a milking robot, and on the other hand washing of the complete milking system, which might be done only 2 or 3 times a day.

Assuming for instance that equipment washing will result in an airflow of 500 liters/minute at an approximate vacuum level of 30 kPa, and that milking requires a steady vacuum of 45 kPa and will result in an airflow of 150 liters/minute, a system comprising two automatic milking robots being served by one single pump, the pump needs to be dimensioned to provide a steady vacuum of 45 kPa with an airflow of 650 liter/minute but also to provide an approximate vacuum level of 30 kPa and an airflow of 1000 liter/minute.

However, the two automatic milking machines are only occasionally both equipment washing or performing other high airflow operations at the same time, but are more commonly performing different tasks, where one may be less requiring. Thus, the vacuum pump must be dimensioned for a situation, which will not occur very often. A vacuum pump dimensioned accordingly will of course be expensive both in purchase and in operation.

SUMMARY OF THE INVENTION

It would thus be beneficial if less costly vacuum pumps could be used and if energy could be saved by only utilising the vacuum power currently needed.

It would also be beneficial if a back-up vacuum pump could be utilized during normal operation.

It is a main object of the present invention to provide such apparatus and method that at least alleviate the above problems.

It is in this respect a particular object of the invention to provide such apparatus and method that reduces the energy consumption for a vacuum source.

It is still a further object of the invention to provide such apparatus and method that reduces the number of required vacuum pumps for a specific milking system installation.

These objects among others, according to a first aspect of the present invention, are attained by a milking system for milking animals comprising at least a first and a second milking machine and a vacuum source provided to supply vacuum to the at least first and second milking machines through conduits. The milking system comprises a control system connected to the first and second milking machines and to the vacuum source, which is provided to regulate the vacuum source depending on the vacuum requirements for the at least first and second milking machines. Vacuum requirements may for instance include vacuum level and/or amount of air per minute that is airflow in liters/minute.

These objects among others, according to a second aspect of the present invention, are attained by a milking system comprising a set of automatic milking machines, wherein each milking machine in the set of milking machines may operate in separate operating modes including milking and equipment washing, the milking system further comprises a set of controlled vacuum pumps, wherein each vacuum pump, in the set of vacuum pumps, may operate in separate pump operating modes. The milking system comprises conduits connecting the set of vacuum pumps to the set of milking machines, controllable valves provided in the conduits for connecting or disconnecting vacuum pumps, of the set of vacuum pumps, to milking machines in said set of milking machines, and a control system provided to control the operating mode for each vacuum pump in the set of vacuum pumps and to control the controllable valves.

These objects among others, according to a third aspect of the present invention, are attained by a vacuum source for providing vacuum to at least a first vacuum drain through conduits, comprising at least a first and second vacuum pump. The vacuum source comprises a control system provided to receive an indication of the vacuum requirements for the at least first vacuum drain and regulate the power of the at least first and second vacuum pump so that minimal power consumption is achieved for the required vacuum.

These objects among others, according to a fourth aspect of the present invention, are attained by a method for providing vacuum by means of a vacuum source to a vacuum drain through a system of conduits, and wherein the vacuum source comprises at least a first and a second vacuum pump, and a control system connected to the at least first and second vacuum pump and the vacuum drain. The method comprises the steps of:—receiving, in the control system, an indication of the vacuum requirements for the vacuum source, and—regulating the at least first and second vacuum pump to achieve the vacuum requirements.

Consequently, it is possible to reduce or minimize the consumed energy for supplying vacuum to a number of milking machines having different vacuum requirements during different times by adapting the number of vacuum resources, such as vacuum pumps. It is also possible to utilize a back-up pump as a second pump to thereby reduce capital cost.

According to one version of the present invention the control system is provided to detect a milking machine operating mode, from a set of milking machine operating modes, for each of the at least first and second milking machine, wherein a first detected milking machine operating mode for a milking machine has different vacuum requirements than a second milking machine operating mode, and the control system is provided to select a vacuum source operating mode for the vacuum source, from a set of vacuum source operating modes, depending on the detected milking machine operating mode for the at least first and second milking machines.

Thereby, a vacuum source operating mode can be selected which is optimal for the detected milking machine operating modes in terms of, for instance, energy consumption.

According to another version of the present invention the control system is provided to receive a vacuum request signal from each of the at least first and second milking machine, the control system is provided to determine from the received vacuum request signals a total vacuum requirement for all of the at least first and second milking machine, and the control system is provided to regulate the vacuum source to provide the required vacuum.

Thus, the vacuum source is set to provide vacuum to all milking machines requiring vacuum.

According to another version of the present invention the vacuum source comprises at least two individually controllable vacuum pumps connectable, through the conduits, to each of the at least first and second milking machine.

With at least two individual vacuum pumps, one vacuum pump may be stopped when a lower level of vacuum requirements prevails. By stopping one vacuum pump significant energy is saved.

According to another version of the present invention the conduits comprise individually controllable valves provided to disconnect or connect a particular of said vacuum pumps, and the control system is provided to control the valves in relation to vacuum requirements for the at least first and second milking machines.

Through individually controllable valves provided in the conduits arranged for connecting vacuum pumps to the milking machines, individual pumps and milking machines may be connected or disconnected, whereby control is achieved over the conduit configuration.

According to one version of the present invention the set of milking machine operating modes comprises maintenance mode, milking mode and washing mode.

According to one version of the present invention the set of vacuum source operating modes comprises stand-by mode, maintain vacuum level mode, maintain airflow mode, maintain vacuum level and minimum airflow mode and full mode.

According to one version of the present invention the vacuum request signal comprises data relating to expected vacuum requirements, including requirements regarding vacuum level and airflow or expected vacuum level and airflow, for the milking machine.

According to one version of the present invention the vacuum request signal comprises information regarding a requested milking machine operating mode, the control system comprises table information, relating a specific milking machine operating mode to vacuum level requirements and expected airflow.

According to one version of the present invention the milking machine is an automatic robotic milking machine and at least one vacuum pump in the set of vacuum pumps is a rotation speed controlled vacuum pump, such as a frequency controlled vacuum pump.

According to one version of the present invention the control system is connected to each milking machine in the set of milking machines and provided to receive vacuum requirement request messages from each milking machine in the set of milking machines. The vacuum requirement request may comprise one or more requirements from a set of requirements including: minimum vacuum level, maximum vacuum level, minimum air flow, maximum air flow, time of deliverance, vacuum stability requirements.

According to one version of the present invention the control system is provided to send a confirmation message to a milking machine having sent a vacuum requirement request message at least indicating if the request is granted. The confirmation message may also indicate when the vacuum requirement is available.

These objects amongst other, according to a fifth aspect of the present invention, are attained by a vacuum source for providing vacuum to at least a first vacuum drain through conduits, comprising at least a first and a second vacuum pump. The vacuum source comprises a control system provided to detect the consumed airflow, and to control the operation of each of the first and second vacuum pump based on the detected airflow.

These objects amongst other, according to a sixth aspect of the present invention, are attained by a method for providing vacuum to at least a first vacuum drain through conduits, comprising at least a first and second vacuum pump. The method comprises the steps of:—detecting the consumed airflow, and—controlling the operation of each of the first and second vacuum pump based on the detected airflow.

By controlling the operation of the vacuum pumps depending on the airflow it is possible to start and stop individual vacuum pumps based on the airflow requirements currently prevailing. It is also possible to control one or several vacuum pumps to operate at an optimal rotation speed and use only one or a few vacuum pumps for controlling the vacuum level by controlling their rotation speed.

According to one variant of the fifth or sixth aspect of present invention the control system is provided to keep the second vacuum pump switched off if the detected airflow is within a first airflow interval.

If the airflow requirements are so low that only one vacuum pump is sufficient to handle this airflow, the other vacuum pump may be switched off. This will save energy as well as wear and tear on the vacuum pump so switched off.

According to one variant of the fifth or sixth aspect of present invention the control system is provided to control the level of the provided vacuum by controlling the rotation speed of the first vacuum pump.

By controlling the rotation speed of the vacuum pump it is possible to control the vacuum level provided by the vacuum pump system to for instance a milking implement.

According to one variant of the fifth or sixth aspect of present invention the control system is provided to keep the first vacuum pump at a first rotation speed, and control the level of the provided vacuum by controlling the rotation speed of the second vacuum pump, if the detected airflow is within a second airflow interval.

According to one variant of the fifth or sixth aspect of present invention the first rotation speed is the rotation speed for which the first vacuum pump is optimally designed.

According to one variant of the fifth or sixth aspect of present invention the vacuum source comprises a third vacuum pump.

According to one variant of the fifth or sixth aspect of present invention the control system is provided to switch the first, second and third vacuum pumps so that each of the first, second and third vacuum pumps are alternatingly used as back-up pump and the other two as operating vacuum pumps. It should be made clear that any number of vacuum pumps can be used in the vacuum source.

Further characteristics of the invention and advantages thereof will be evident from the following detailed description of embodiments of the invention.

BRIEF DESCRIPTION OF THE DRAWINGS

The present invention will become more fully understood from the detailed description of embodiments of the present invention given herein below and the accompanying FIGS. 1-6, which are given by way of illustration only, and thus are not limitative of the present invention.

FIG. 1 is a schematic block diagram of an embodiment according to the present invention comprising two vacuum pumps and two milking machines.

FIG. 2 is a schematic block diagram of another embodiment according to the present invention where two vacuum pumps serve three milking machines.

FIG. 3 is a schematic block diagram of another embodiment according to the present invention where a back-up vacuum pump is included.

FIG. 4 is a schematic block diagram of another embodiment according to the present invention disclosing a multitude of vacuum pumps and milking machines.

PREFERRED EMBODIMENTS

Figure 5:
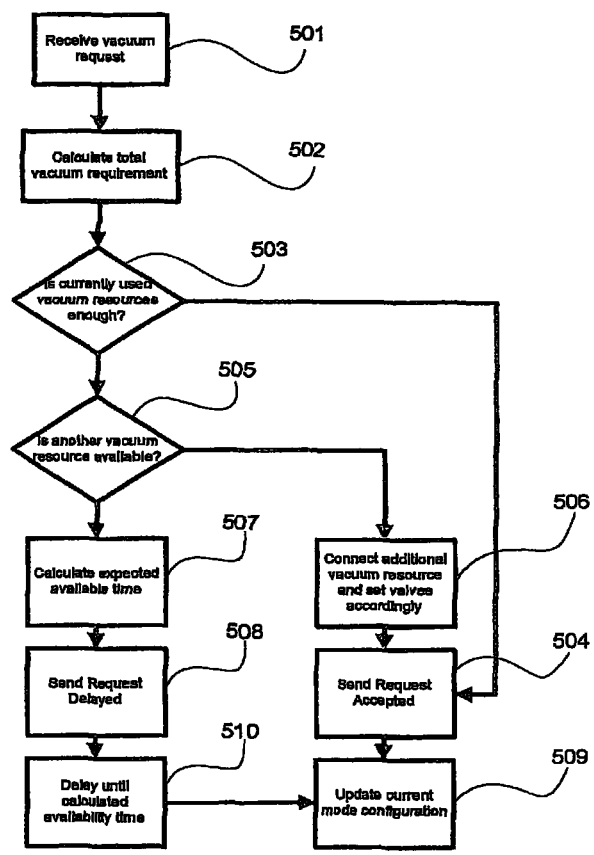
FIG. 5 is a schematic flow diagram of an embodiment according to the present invention.

In the following description, for the purpose of explanation and not limitation, specific details are set forth, such as particular techniques and applications in order to provide a thorough understanding of the present invention. However, it will be apparent to one skilled in the art that the present invention may be practiced in other embodiments that depart from these specific details. In other instances, detailed descriptions of well-known methods and apparatuses are omitted so as not to obscure the description of the present invention with unnecessary details.

FIG. 1 is a schematic block diagram of a milking system according to the invention. A first and a second vacuum pump, 101 and 102, are connected by a first and a second conduit 103a and 103b, through a first and a second valve, 104 and 105, to respective first and second milking machines 106 and 107. A third conduit 103c connects the first and the second conduit 103a and 103b, and includes a third valve 108. A control system 109 is connected to the milking machines, the vacuum pumps and to the valves and is provided to receive information regarding the operation of the units as well as to control the respective units. The second pump 102 may preferably be a back-up pump.

A back-up pump is a vacuum pump used as stand-by, that is the back-up vacuum pump is not normally operating, but rather used in case of a failure of an operating vacuum pump.

The operation of the milking system in FIG. 1 is as follows. The vacuum pumps are dimensioned to be capable of maintaining a vacuum level of approximately 45 kPa at an airflow of 700 liter/minute. The first milking machine 106 may operate in different operating modes, requiring different vacuum levels and resulting in different airflows according to the table below.

TABLE 1

| Milking machine modes | | |
|---|---|---|
| Mode | Function | Vacuum req. |
| 0 | Off | No Vacuum |
| 1 | Milking | Required vacuum level = 45 kPa. Low airflow ~150 l/min |
| 2 | Teat Cleaning | Requested vacuum level = 45 kPa. Required vacuum level ~30 kPa High airflow ~1000 l/min |
| 3 | Equipment washing | Full speed, High airflow ~500 l/min |
| 4 | Maintenance | 10-20 kPa, Very low airflow ~20 l/min |

In mode=0 the milking machine is switched off and consequently no vacuum is required.

In mode=1 a milking animal is milked and it is required, for instance due to animal health, but also to achieve a good milking result, that the vacuum level is kept steady at the specified level of 45 kPa. During milking the airflow is relatively low, approximately 150 liters/minute.

In mode=2, teat cleaning is performed, which results in a very high airflow of 1000 liters/minute. In this mode the set-point for the vacuum pump is normally set to 45 kPa, but due to the high airflow the pump may be unable to maintain the vacuum level, which could fall to approximately 30 kPa.

In some installations a teat cleaning cup, similar to a milking teat cup, is used in which water and pressurized air is introduced into the cup to clean the teat, and where the water is removed using vacuum in the teat cleaning cup. This will result in the above mentioned large airflow. Alternatively, other means may be used to clean teats, such as brushes etc, which may not require any vacuum.

In mode=3 the milking machine is washed and airflow is rather high, approximately 500 liters/minute. The vacuum level is normally around 40 kPa.

In mode=4 the milking machine is in what is called maintenance mode. For a robotic automatic milking machine this could for instance be when the milking machine is waiting for a new animal to enter the milking machine. The vacuum level is set to e.g. 20 kPa and the airflow is very low, approximately 20 liters/minute.

The second milking machine 107 operates in the same modes as the first milking machine 106. The two milking machines 106 and 107 are moreover operating completely independent of each other, so that one milking machine may operate in any mode independent of the other.

Thus, the first and the second milking machine 106 and 107, have different vacuum requirements depending on the relevant operating mode. The control system 109 detects the operating mode of the first and the second milking machine, preferably some time before the actual mode occurs. This is to give the first and the second vacuum pump 101 and 102 time to achieve the required vacuum level. This can be achieved for instance by including information in the control system 109 of when certain modes occur in relation to other events or modes. For instance, it is easy to realize that the milking mode will occur a specific time after a teat cleaning mode has commenced.

The control system may detect the operating mode simply by measuring the vacuum level and airflow consumed by the milking machines using conventional vacuum and airflow gauges.

The control system may comprise a communication module for receiving the detect milking machine operating mode from the milking machine. The control system uses a protocol to communicate with each milking machine, i.e. TCP/IP, where the milking machines sends messages to the control system indication what operating mode the machine is in, or will be in shortly. The message may optionally include information relating to the vacuum requirement, or the control system may comprise a table relating the operating mode to the required, or requested vacuum level, and the expected airflow. This will of course mean that each milking machine must comprise its own control system, having a communication module capable of communication with the control system.

The control system then controls the first, the second and the third valve, 104, 105 and 108, as well as the first and the second vacuum pump 101 and 102, depending on which modes were detected, according to the table below. When the first pump 101 is turned off, the first valve 104 is also turned off, and when the second pump 102 is turned off, the second valve 105 is turned off.

The vacuum pumps may together take different operating modes, depending on the instructions received by each vacuum pump from the control system. These modes include stand-by mode, maintain vacuum level mode, maintain airflow mode, maintain vacuum level and minimum airflow mode and full mode.

TABLE 2

Logic table for two vacuum pumps and two milking machines, MM1 and MM2.

| MM1 mode | MM2 mode | Third valve | First pump | Second pump |
|---|---|---|---|---|
| 0 | 0 | NA | Off | Off |
| 0 | 1 | Closed | Off | On |
| 0 | 2 | Closed | Off | On |
| 0 | 3 | Closed | Off | On |
| 0 | 4 | Closed | Off | On |
| 1 | 1 | Open | On | Off |
| 1 | 2 | Closed | On | On |
| 1 | 3 | Closed | On | On |
| 1 | 4 | Open | On | Off |
| 2 | 2 | Closed | On | On |
| 2 | 3 | Closed | On | On |
| 2 | 4 | Open | On | Off |
| 3 | 3 | Closed | On | On |
| 3 | 4 | Open | On | Off |
| 4 | 4 | Open | On | Off |

Symmetric modes have been excluded for sake of clarity and space.

For the mode configurations {1,1}, {1,2}, {2,2}, {2,3}, {2,4}, and corresponding symmetric modes, only the first vacuum pump 101 is required to fulfil the vacuum requirements from both milking machines, and the second vacuum pump 102 is consequently turned off. This results in substantial energy and thereby cost savings. If for instance, for a specific milking system, each milking machine is in maintenance mode for 2 hours per day and in milking mode for 14 hours per day the energy savings are (2+14)/24*50%=33%.

FIG. 2 is a schematic block diagram of a milking system 200 according to the invention comprising a first 201 and a second vacuum pump 202 serving a first, a second and a third milking machine denoted 203, 204 and 205, respectively, through conduits 206. The milking system in FIG. 2 comprises a first valve 207 for disconnecting the first vacuum pump 201 from the conduits 206 and a second valve 208 for disconnecting the second vacuum pump 202 from the conduits 206. The milking system 200 further comprises a third, a fourth and a fifth valve denoted 209, 210 and 211, respectively, for controlling vacuum deliverance to the respective milking machines. All valves, milking machines and vacuum pumps are monitored and controlled by a control system 212. Thus, as is clear from the figure, only two vacuum pumps serves three milking machines. This, means that the milking system 200 saves one pump compared to milking systems according to the prior art.

The operation of the milking system 200 is as follows. Each of the first, second and third milking machine may independently operate in any mode according to table 1. The control system controls the valves and vacuum pumps so that the required vacuum levels are achieved with the expected airflows. Each pump has a capacity of 700 liters/minute at 45 kPa and thus the two vacuum pumps, in the present embodiment, have a total capacity of 1400 liters/minute at 45 kPa and 2000 liters/minute at 30 kPa.

The following table lists the mode configuration for which two vacuum pumps may supply the required vacuum levels.

TABLE 3

Two vacuum pumps serving three milking machines. The mode configuration relates to table 1.

| Mode Configuration | Airflow | Vacuum level |
|---|---|---|
| {1, 1, 1} | ~450 l/m | Required 45 kPa |
| {1, 1, 4} | ~320 l/m | Required 45 kPa |
| {1, 3, 4} | ~670 l/m | Required 45 kPa |
| {1, 4, 4} | ~190 l/m | Required 45 kPa |
| {3, 3, 4} | ~1020 l/m | Requested ~30 kPa |
| {2, 4, 4} | ~1040 l/m | Requested ~45 kPa |
| {3, 4, 4} | ~540 l/m | Requested ~30 kPa |
| {4, 4, 4} | ~60 l/m | Requested ~30 kPa |

If one of the milking machines in milking system 200 is switched off, that is in mode=0 one or more of the first, the second or the third milking machine, table 2 applies with values 209, 210 and 211 adjusted accordingly. For mode {3,3,4} and {2,4,4} the airflow is slightly above the capacity of the first pump, but since it is not absolutely necessary to maintain the requested vacuum level of 30 kPa or 45 kPa, a corresponding vacuum drop, due to the slightly higher airflow, is acceptable.

The control system 212 thus controls the first, the second, the third, the fourth and the fifth valve and the first and the second vacuum pump according to which milking machine requires vacuum and how much air flow is required. If the projected airflow is above 700 liters/minute and a vacuum of 45 kPa is required, or if the projected airflow is well above 1000 liters/minute, the second pump will be connected to the conduits 206 to provide vacuum. The specific regulations of the individual valves are trivial and will no be dealt with here.

Consequently, for any of the combined mode configurations in table 3 above, or for the corresponding mode configurations in table 2 when one of the three milking machines in the milking system 200 is in mode=0, only one vacuum pump is operational and the other is switched off. Clearly this will save significant energy and money.

For some mode configurations, for instance mode configurations {2,2,2} and {3,3,3}, not even both vacuum pumps are capable of supplying enough vacuum. These mode configurations are seldom occurring at the same time and one solution for instance may be to let the control system 212 instruct one of the milking machines to wait with the requested operation until sufficient vacuum is available. FIG. 3 is a schematic block diagram of an embodiment according to the present invention wherein a third vacuum pump 301 is included compared to the milking system 200 in FIG. 2. In this embodiment there is no mode configuration, which cannot be handled by the vacuum source consisting of the three vacuum pumps.

FIG. 4 is a schematic block diagram of a general milking system 400 according to the present invention comprising a vacuum source 401, comprising multiple vacuum resources 405, and a vacuum drain 402, comprising multiple milking machines 406 connected together by a conduit system 403. The vacuum source 401, vacuum drain 402 and conduit system 403 are monitored and controlled by a control system 404. The milking system 400 is a generalization of the embodiments described in connection with FIGS. 1, 2 and 3, and operates accordingly.

FIG. 5 is a schematic flow diagram of an embodiment of the operation of the milking system in FIG. 4. The control system 404 receives a vacuum request in step 501 from one individual milking machine 406. In step 502 the total vacuum requirement of the milking system is calculated and a test is performed in step 503 to verify if the currently engaged individual vacuum resources 405 are enough to comply with the new total vacuum requirement. If this is the situation the control system sends a "request accepted" signal to the requesting individual milking machine 406, indicating that the vacuum drain may commence its operation in step 504. The current mode configuration is then updated in a step 509.

If, however, the currently engaged vacuum resources 405 are not capable of supplying the requested vacuum, a test 505 is performed to verify if an additional vacuum resource 405 is available. If this is the case, the additional vacuum resource 405 is connected and corresponding valves in the conduit system are set accordingly in a step 506.

If no other vacuum resource is available the control system 404 calculates the expected availability time in a step 507 and sends a "request delayed" signal to the individual requesting milking machine 406 in a step 508. Finally, after a delay 510 corresponding to the calculated availability time, the current mode configuration is updated 509.

Figure 6:
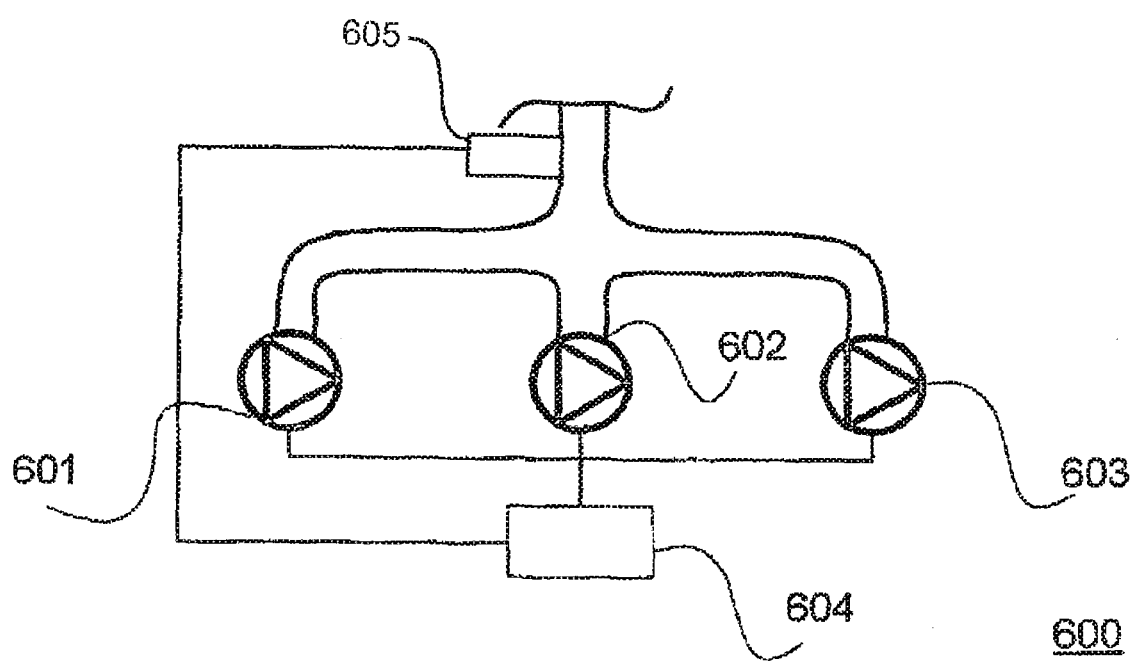
FIG. 6 is a schematic block diagram of a vacuum source according to one aspect of the present invention.

FIG. 6 is a schematic block diagram of a vacuum source system according to the invention comprising a first, a second and a third vacuum pump, denoted 601, 602 and 603 respectively. A control system 604 is connected to each vacuum pump for control of the vacuum pumps. This control includes start and stop as well as control of rotation speed of each individual vacuum pump. The control system also monitors the airflow, e.g., using airflow gauge 605, in the vacuum pump system 600.

Even though, the control of the vacuum pumps as described herein, primarily focus on control by monitoring the airflow, other ways of controlling the operation of the vacuum pumps are of course possible, such as monitoring the vacuum level, the rotation speed of each vacuum pump etc. For instance, may the rotation speed of the vacuum pump give an indirect measurement of the airflow.

In this example each vacuum pump has a capacity of 4000 liters/minute, and the system 600 will replace a conventional vacuum system having an operating vacuum pump and a back-up vacuum pump each having a capacity of 8000 liters/minute.

The control system 604 is provided to control the operation of each of the first, second and third vacuum pump depending on a calendar and the detected airflow.

Of the three vacuum pumps only two will be operational at any particular time and the third will be designated as back-up pump. The designation as back-up pump will switch between the three vacuum pumps according to a specified scheme.

This can for instance achieved according to the following table:

| Day | Pump #1 | Pump #2 | Back-up pump |
|---|---|---|---|
| 1 | First 601 | Second 602 | Third 603 |
| 2 | Third 603 | First 601 | Second 602 |
| 3 | Second 602 | Third 603 | First 601 |
| ... | ... | ... | ... |

Thus, the vacuum pump designated as vacuum pump #1 will switch, as will the vacuum pump designated as #2 and as back-up. This has a number of advantages in that all vacuum pumps will be run regularly and evenly, all vacuum pumps need service at the same time and the service occasions will be farther apart, the expected life time of the vacuum pumps is doubled, easy service in that the back-up pump may first be serviced where after a switch is ordered and the new back-up pump can be serviced etc.

During operation of the vacuum pump system 600 only pump #1 and pump #2 are operational while the designated back-up pump is switched off.

If any one of pump #1 or pump #2 breaks down during operation the back-up pump is used instead of the broken pump, which may then be repaired without any stop in the operation of the vacuum system.

The operation and rotation speed of the operational pumps #1 and #2 is controlled based on the detected airflow according to the table below:

| Detected airflow (l/m) | Pump #1 | Pump #2 |
|---|---|---|
| 0-3000 | Rotation speed controlled | Off |
| 3000-5000 | Optimal rotation speed | Rotation speed controlled |
| 5000-7000 | Rotation speed controlled | 75% |
| 7000-8000 | 100% | Rotation speed controlled |

During the first airflow interval with 0-3000 liters/minute airflow pump #2 is off and the vacuum level is controlled using rotation speed control of vacuum pump #1. When the airflow rises above 3000 liters/minute and is within the second interval with 3000-5000 liters/minute airflow vacuum pump #1 reduces its speed to an optimal rotation speed. The optimal rotation speed is the rotation speed for which the vacuum pump is most efficient. In the second interval vacuum pump #2 is started and takes over the control of the vacuum level by adjustment of its rotation speed as controlled by the control system 604.

During the third interval with 5000-7000 liters/minute airflow the vacuum pump #2 is set to an operation efficiency of approximately 75% of its maximum capacity of 4000 liters/minute and the vacuum level is controlled by rotation speed control of vacuum pump #1. Finally, during the fourth interval with 7000-8000 liters/minute airflow vacuum pump #1 is set to operate at its maximum capacity, that is 4000 liters/minute airflow, and vacuum pump #2 is rotation speed controlled to control the vacuum level.

The specific interval may of course be provided with suitable hysteresis, so that the operation of the vacuum pumps is not affected if the airflow varies close to a threshold of a specific interval. Moreover, the specific interval thresholds may be different and should be adjusted according to the specific requirements prevailing in the implementation. If other sizes of vacuum pumps are used this will of course also have an impact on the selected intervals.

This arrangement provides a number of advantages. For instance, it is easier to expand the system. This can easily be achieved by simply adding a further operational vacuum pump and adjusting the intervals accordingly. Energy is saved in that a smaller motor is operated. The vacuum pumps are operated at a more suitable rotation speed. A smaller back-up pump is used. In the example above, a 4000 liters/minute back-up pump is used in stead of an 8000 liters/minute back-up pump. A smaller vacuum pump is easier to handle.

It will be obvious that the invention may be varied in a plurality of ways. Such variations are not to be regarded as a departure from the scope of the invention. All such modifications as would be obvious to one skilled in the art are intended to be included within the scope of the appended claims.

What is claimed is:

1. A method for providing vacuum from a vacuum source to at least a first vacuum drain through conduits of a vacuum pump system, said method comprising:

detecting a consumed airflow within defined airflow ranges that comprise first, second, and third airflow ranges with different respective lower end values and higher upper end values, the first airflow range being less than the second airflow range, and the second airflow range is less than the third airflow range, wherein the consumed airflow is measured with an airflow gauge;

with a control system, providing vacuum to at least the first vacuum drain through the conduits of the vacuum pump system by the control system automatically controlling a rotation speed of each of at least a first vacuum pump and a second vacuum pump, said first and second vacuum pumps respectively each i) having an optimal rotation speed, ii) having a maximum rotation speed, and iii) being rotation speed controllable to plural non-zero speeds, wherein the optimal rotation speed is less than the maximum rotation speed, the lower end value of the second airflow range being less than a maximum airflow capacity of the first vacuum pump;

while detecting said consumed airflow in the first airflow range, the control system controlling a vacuum level of the provided vacuum by keeping said second vacuum pump turned off and controlling the rotation speed of said first vacuum pump to vary at plural non-zero speeds below the maximum airflow capacity of the first vacuum pump; and when detecting the consumed airflow to have increased from the first airflow range to be at the lower end value of the second airflow range, the control system providing the vacuum by starting the second vacuum pump so that the second vacuum pump is started before the maximum airflow capacity of the first vacuum pump is reached, and with said control system keeping both the first and second vacuum pumps running, said control system controlling the rotation speed of said first vacuum pump at a first fixed rotation speed less than the maximum rotation speed, and second vacuum pump to vary at non-zero speeds within the second airflow range to thereby maintain the vacuum level in the system.

2. The method according to claim 1, wherein when detecting the consumed airflow as falling from the lower end value of the second airflow range into the first airflow range, said control system i) switching off the second vacuum pump and keeping said second vacuum pump switched off when the detected consumed airflow is within the first airflow range, and ii) while the detected consumed airflow is in the first airflow range, controlling the vacuum level of the vacuum to the at least first vacuum drain by controlling the rotation speed of said first vacuum pump to plural non-zero speeds.

3. The method according to claim 1, wherein, when detecting the consumed airflow in the second airflow range, said control system further controls the vacuum level provided for said vacuum drain by controlling the rotation speed of said first vacuum pump at the optimal rotation speed, and controlling the rotation speed of said second vacuum pump to vary at plural non-zero speeds to thereby maintain the vacuum level in the system, and when detecting the consumed airflow in the third airflow range, said control system controlling the rotation speed of said first vacuum pump to vary to plural non-zero speeds to thereby maintain the vacuum level in the system, and further controlling said second vacuum pump at a fixed rotation speed less than the maximum rotational speed.

4. The method according to claim 1, wherein said first fixed rotation speed is the optimal rotation speed for which said first vacuum pump is optimally designed.

5. The method according to claim 1, wherein, when detecting the consumed airflow within the third airflow range, said control system keeps said second vacuum pump at a fixed rotation speed less than the maximum rotational speed and controls said vacuum level provided for said vacuum drain by controlling the rotation speed of said first vacuum pump to vary at plural non-zero speeds to thereby maintain the vacuum level in the system.

6. The method according to claim 1, wherein said vacuum source comprises a third vacuum pump.

7. The method according to claim 6, comprising the further step of said control system switching said first, second and third vacuum pumps so that each of said first, second and third vacuum pumps are alternatingly used as a back-up pump and the other two pumps are used as operating vacuum pumps serving as the first and second vacuum pumps.

8. The method according to claim 6, wherein, when detecting the consumed airflow to be within a fourth airflow range greater than the third airflow range, said control system keeps said first and second vacuum pump at a first rotation speed, and controls a vacuum level provided for said vacuum drain by controlling the rotation speed of said third vacuum pump to vary at plural non-zero speeds.

9. The method according to claim 5, wherein, when detecting the consumed airflow to be within a fourth airflow range greater than the third airflow range, said control system keeps said first vacuum pump at maximum rotational speed and controls a vacuum level provided for said vacuum drain by controlling the rotation speed of said second vacuum pump to vary at plural non-zero speeds.

\* \* \* \* \*